United States Patent [19]
Corsi

[11] Patent Number: 5,277,526
[45] Date of Patent: Jan. 11, 1994

[54] APPARATUS WITH FLOATING TOOL FOR DRILLING, BORING, FLARING AND THE LIKE AT A SET DEPTH USING JIGS

[75] Inventor: Armando Corsi, Piacenza, Italy

[73] Assignee: JOBS S.p.A., Piacenza, Italy

[21] Appl. No.: 25,906

[22] Filed: Mar. 3, 1993

Related U.S. Application Data

[63] Continuation-in-part of Ser. No. 734,592, Jul. 23, 1991, abandoned.

[30] Foreign Application Priority Data

Aug. 9, 1990 [IT] Italy ................ 44819 A/90

[51] Int. Cl.⁵ .............................................. B23B 47/00
[52] U.S. Cl. ...................................... 408/97; 408/124; 408/141; 408/241 S
[58] Field of Search ............... 408/88, 95, 97, 99, 408/100, 112, 129, 124, 202, 241.5, 141; 279/16

[56] References Cited

U.S. PATENT DOCUMENTS

| | | | |
|---|---|---|---|
| 2,498,148 | 2/1950 | Berritta | 279/16 |
| 2,525,646 | 10/1950 | Burg | 279/16 |
| 2,608,114 | 8/1952 | Martin et al. | 408/112 |
| 3,060,772 | 10/1962 | Crump | 408/112 |
| 3,454,283 | 7/1969 | Benjamin et al. | 279/16 |
| 4,668,134 | 5/1987 | Vindez | 408/97 |
| 5,014,542 | 5/1991 | Corsi . | |

FOREIGN PATENT DOCUMENTS

| | | | |
|---|---|---|---|
| 3905728 | 9/1989 | Fed. Rep. of Germany | 408/95 |
| 57586 | 5/1977 | Japan | 408/95 |

OTHER PUBLICATIONS

RB 406 Brochure.

Primary Examiner—Daniel W. Howell
Attorney, Agent, or Firm—Notaro & Michalos

[57] ABSTRACT

An apparatus for controlling depth machining in a space and with the use of jigs, includes a body having two sliding parts biased by a spring and suitable for a drilling tool, with some clearance. One part is provided with couplings for assembling on a machine-tool, and the other is provided with a presser and a drill guide. Another spring which is suitable for keeping the tool centered is included and a relative stroke between the two sliding parts is longer than the drilling stroke of the tool.

7 Claims, 4 Drawing Sheets

APPARATUS WITH FLOATING TOOL FOR DRILLING, BORING, FLARING AND THE LIKE AT A SET DEPTH USING JIGS

This application is a continuation-in-part of application Ser. No. 07/734,592, filed Jul. 23, 1991, now abandoned.

FIELD AND BACKGROUND OF THE INVENTION

This invention relates to an apparatus provided with a floating tool for drilling boring, flaring and other machining work, by using jigs where the working depth is to be precisely set.

In particular, this invention concerns an apparatus to be applied to NC automatic machines, with 5 or more degrees of freedom, for drilling flaring and the like, such machining requiring, particularly in the aeronautics industry, the use of an apparatus suitable for both adjusting possible inaccuracies when positioning the tool with respect to the jig hole axis, and for checking the machining depth in a very limited range of tolerance.

The apparatus is expected to be applied to the machines already known, e.g., from U.S. Pat. No. 5,014,542 and consisting of a movable support along three cartesian axes where a movable tool-holder head is installed and which rotates around two orthogonal axes. Generally, the apparatus may translate along its axis for carrying out the machining required.

The invention relates in particular to, but is not limited to, the field of aeronautic construction and aims at the automation of several machining steps through a numerical control computerization thus replacing the previous manual work, but at the same time keeping their general features. The invention as claimed is intended to provide an apparatus suitable for turning some of the manual machining operations into automatic operations while preventing possible inaccuracies in the tool positioning. As noted above, aeronautical construction is one of the main fields where the apparatus can be applied in accordance with the invention, where parts assembling requires for drilling several holes with flaring is within a limited range of tolerance that is often not over a few 100ths of a mm. The parts to be machined are often curved, which complicates things in a manner so that up to now most holes have been drilled manually with the help of special tools and jigs.

Such known systems were based on the use of a jig provided with bushes and to be applied to the workpiece, then the operator is to carry out the different machining steps manually. Obviously, in spite of the accuracy and care taken, a system like that ensures neither a perfect repeatability of the results nor the observance of the working time set depending on the operator's capability and conditions. Moreover, the working time is quite long.

On the other hand, the complete automation of such machining steps is not possible, in particular for parts which were previously jig-machined, since programming for such a machine arrangement would be remarkable expensive and the different parts would be certified again with a great waste of time and money.

For these reasons, there is a need for apparatuses enabling automation while continuing to use the jigs.

The practical difficulties found are several and related to the need for both centering the tool on the hole to be drilled and checking accurately the tool stroke with respect to the surface to be machined since its position is not previously known even with respect to the jig.

SUMMARY OF THE INVENTION

In order to solve the above-mentioned problem, the invention offers an apparatus provided with a floating tool to be applied to NC automatic machines, suitable for automatically adjusting the tool position so that it is centered on the hole; moreover control systems for an accurate drilling depth are provided, too.

In accordance with the invention the apparatus is provided with a drilling tool of the type generally used to carry out the same machining manually. These tools are known and consist of a body with a presser which is manually placed onto the surface to be machined, and a drill having a pre-set stroke adjustable by means of a ring nut.

When working manually, the operator places the tool, center-lined to the hole, inserts a drill guide of the tool into a bush of the jig to bring the presser into contact with the workpiece surface and then moves the tool forward. The tool rotates at the same time for drilling and flaring operations.

Such tools or tool assembly bodies are manufactured by Recouls et Fils S.A., Ozoir la Ferriere (France) and marked with the abbreviations RB 406.

In accordance with the invention, the apparatus is suitable for using the tools already available on the market, making it, in this way easier for the users who are not compelled to design new tool parts. An automatic processing can be carried out, in this way, with available apparatuses and tools. In order to carry out a preset machining automatically, this apparatus, which permits a preset drilling depth to be selected, is joined to a floating tool suitable for an automatic centering.

In accordance with the invention this tool has been provided with a suitable body for joining with machine-tools and in particular for numerical control machines. The body makes the tool feed and rotate, as well as float both in a plane orthogonal to its axis and with angularly limited movements with respect to that axis.

BRIEF DESCRIPTION OF THE DRAWINGS

The invention will be described in detail below, as an example, with reference to the drawings wherein.

DESCRIPTION OF THE PREFERRED EMBODIMENTS

Figure 1:
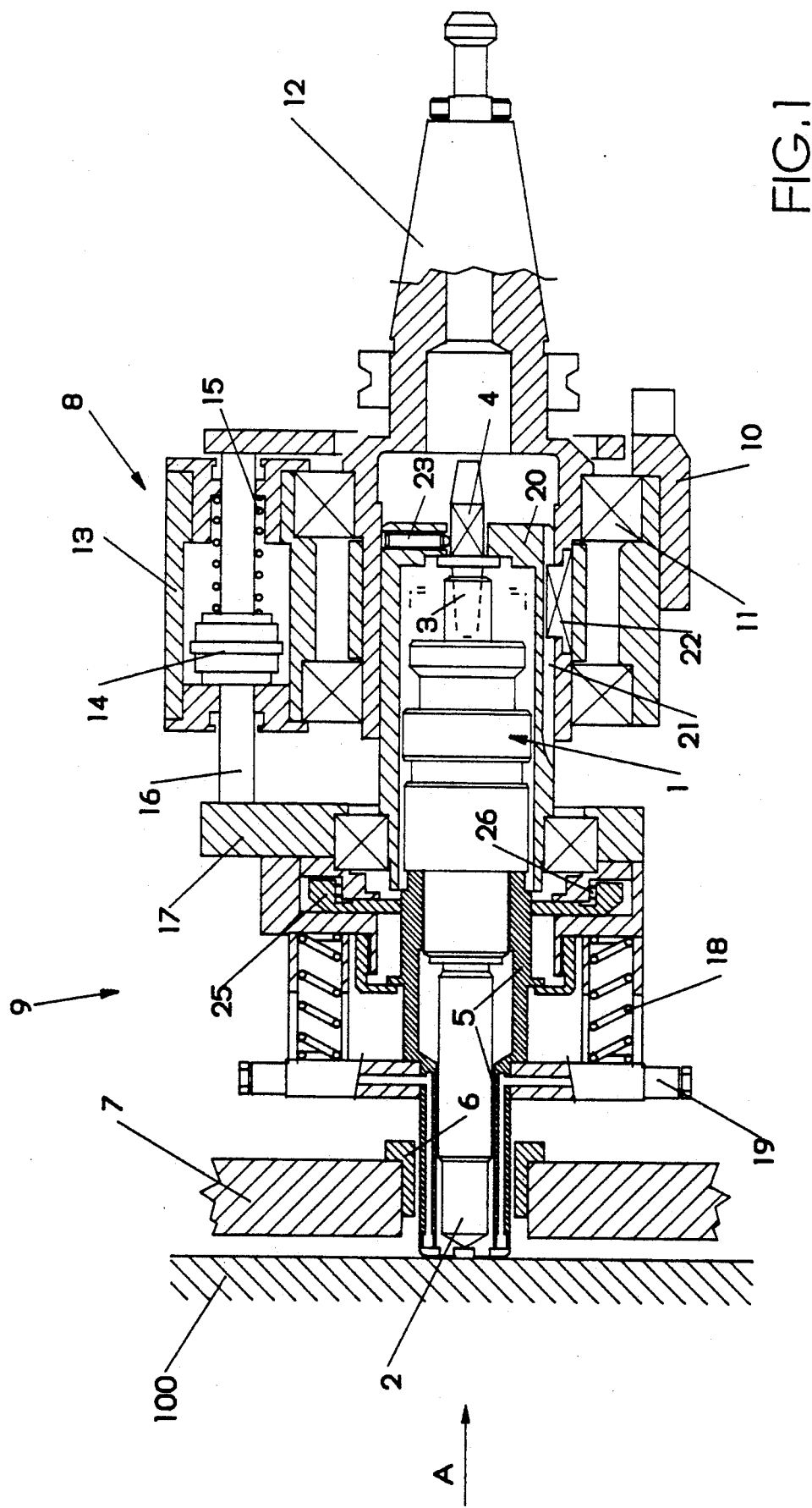
FIG. 1 shows the apparatus in sectional view according to the invention with the tool installed.

Referring to FIG. 1, a tool assembly body 1 of a known commercial type, e.g., the RB 406 mentioned above, is provided with a cutting tool in the form of a drill 2 and a coupling 3 having a projection for a prismatic spigot, in particular a square spigot 4. The drill is connected to an opposite end of coupling 3 and rotates inside the body 1.

The tool body 1 is provided with a drill guide or presser 5 to be inserted into a tool guide bush 6 of a jig 7 for making the tool exactly machine a workpiece 100.

Figure 4:
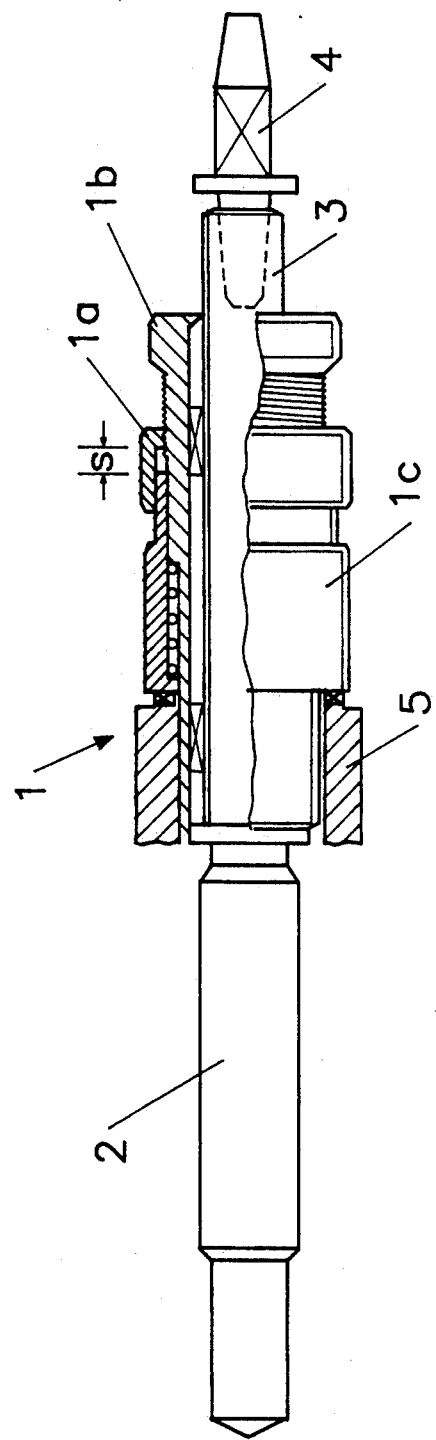
FIG. 4 is a partially sectional view of a tool assembly body used in accordance with the invention.

The drilling or flaring depth is controlled by the tool body 1, by a ring nut 1a in FIG. 4, which is turned to set the drill stroke S and therefore the working depth, for drilling, flaring, etc.

In FIG. 4, the tool assembly body generally designed 1 is shown to comprise the coupling 3 with its projection which, at one end, receives the square spigot 4 and at the other end receives the drill 2. Coupling 3 is rotatably mounted within a body part 1b which threadably carries the ring nut 1a that adjusts the length of stroke S. Coupling 3 is rotatably mounted to assembly part 1b but axially moveable together with the part 1b. Part 1c of body 1 is axially movable on part 1b, but co-rotationally mounted to part 1b so that parts 1c and 1b rotate with each other but can move axially with respect to each other up to stroke S.

Since it is not possible to know precisely the position of the workpiece surface with respect to the jig, because of the different bending or the uneven surface—e.g. in case of carbon fiber pieces—it is necessary to balance the possible differences. This will be possible in accordance with the invention since the apparatus has two sliding parts with the tool installed inside.

Figure 3:
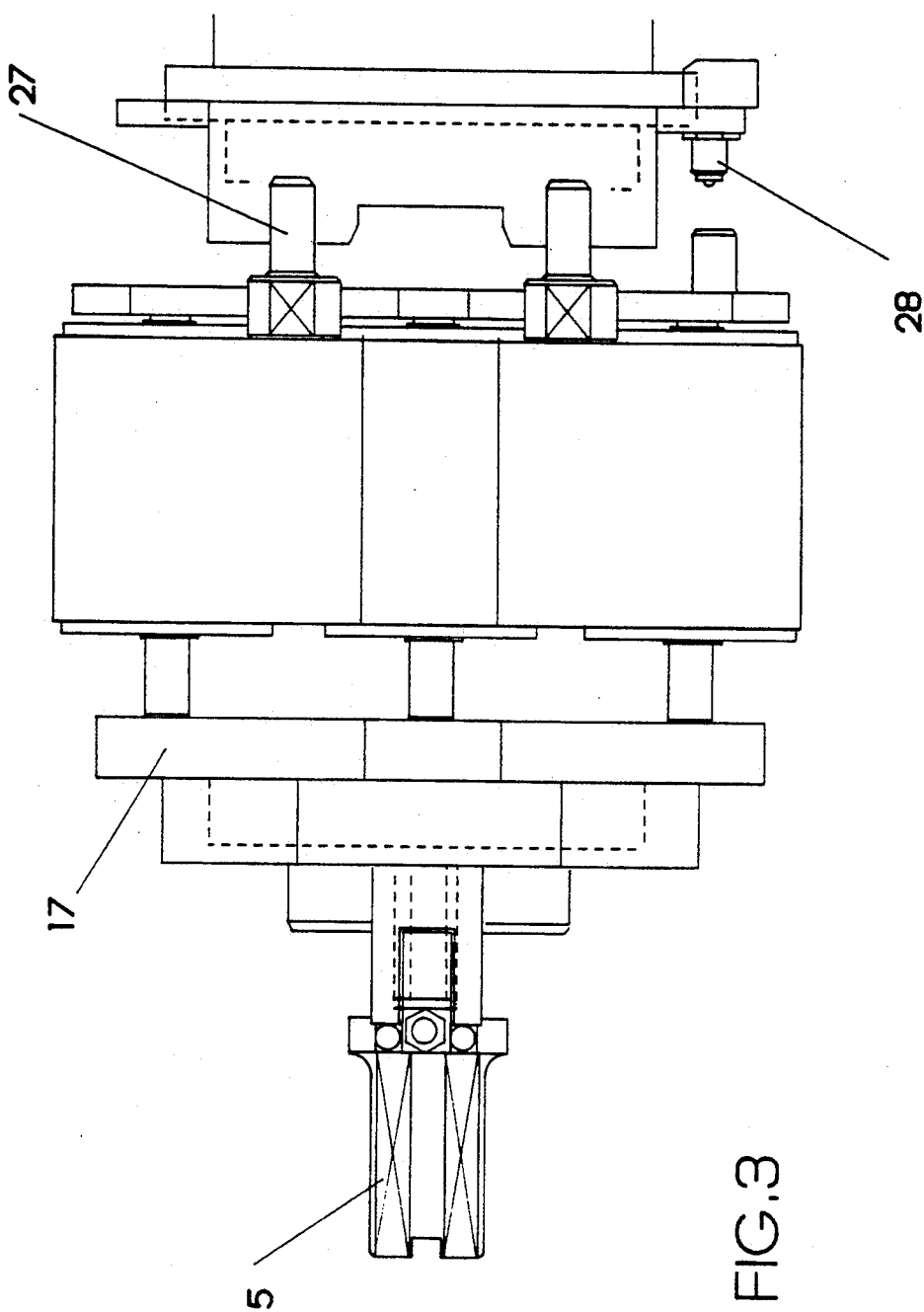
FIG. 3 is a side view of the apparatus.

The apparatus is constructed to carry out a greater stroke than the stroke necessary for drilling so as to be sure the required depth is reached. The parts 1a and 1c may slide along one another, which avoids the situation where the drilling depth exceeds the limit set, and such sliding starts once the drill has reached the maximum depth set, as clearly described. As said, the apparatus in which the tool body 1 is installed consists of two parts marked 8 and 9, respectively. Part 8 is provided with the coupling devices for a machine (shown at the right in FIG. 3) and part 9 acts as a presser for the workpiece 100 to be machined. The parts 8 and 9 may slide, one with respect to the other.

The first part 8 consists of a body 10 where a standard conical coupling body 12 is installed by means of a bearing 11, for connection to the machine.

Figure 2:
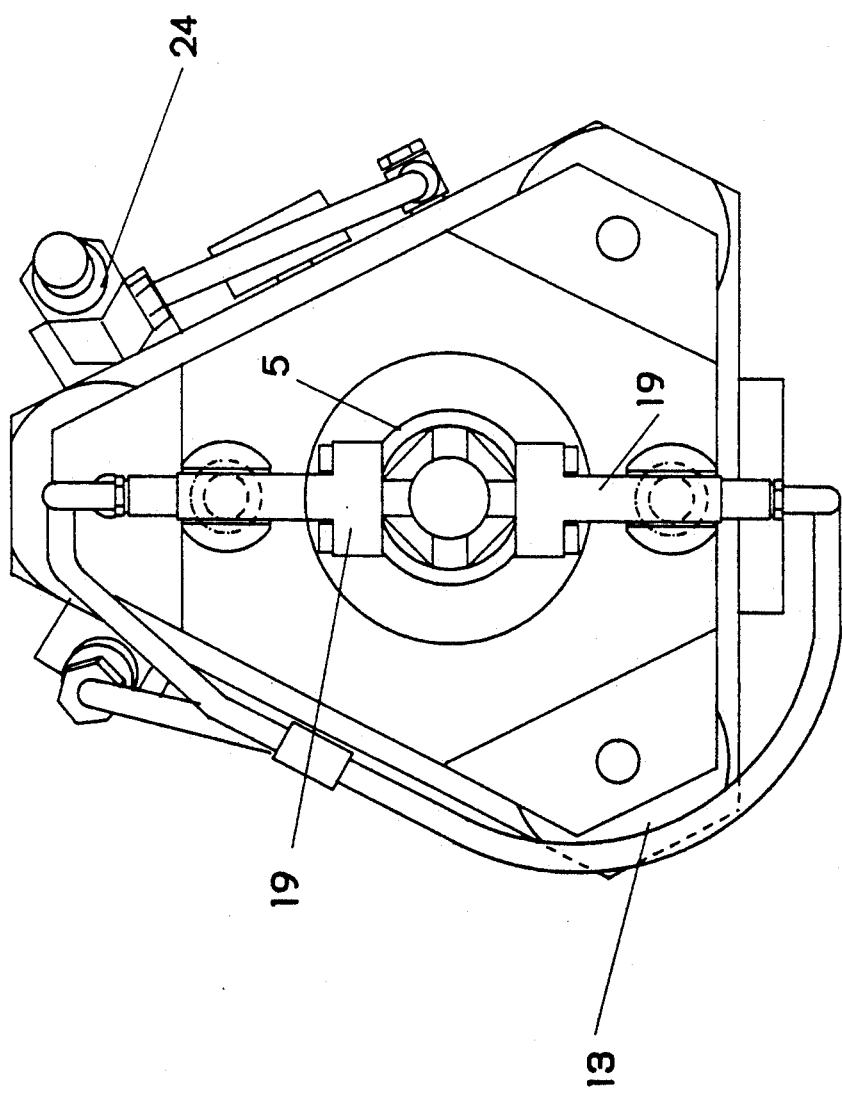
FIG. 2 is a view of FIG. 1 taken along arrow A.

Only one of the three pneumatic cylinders 13 installed in the body 10 is shown in FIG. 1. Each cylinder is provided with sliding pistons 14, fed by pressure preset through a standard regulator 24 shown in FIG. 2, and read with a pressure gauge depending on the charge required to extend the piston in the cylinder.

A spiral spring 15 or similar biasing means, keeps the piston 14 extended when the pneumatic feed faults, e.g., when the apparatus is stored. The pistons 14 have piston rods 16 which are provided with a flange 17 where a pair of blocks 19, integral with the drill guide 5, are installed. These blocks carry feeding ducts for coolant to be used during machining operations.

The blocks 19 may slide with respect to the flange 17 and drill guide 5, and under the force of springs 18. The cylinders, pistons and rods form drive means between the first part 8 and the second part 9.

The part 1c of tool body 1 is screwed to the drill guide 5 which is integral with the blocks 19 and in this way parts 1c and 1b of the body 1 cannot rotate.

Coupling body 12 for the machine is hollow inside and receives a sliding bush 20 provided with a groove 21 which meshes with a tooth 22 integral with the coupling body 12. As a consequence, the body 12 makes the bush 20 rotate; the bush can, however, slide with respect to the body axis.

The tool body 1 is installed inside the bush 20 and the prismatic spigot 4 is inserted in a proper hole provided in the back wall of the bush and with slightly greater dimensions than the spigot, e.g., 1 or 2 mm more or so, to let the spigot oscillate or move slightly inside, while rotating.

The bush 20 thus makes the drill 2 rotate by means of the spigot 4 while the tool body part 1c, screwed to the drill guide 5, cannot rotate. A set of spring pressers act on the different faces of the prismatic spigot in order to keep it centered.

The outer diameter of the tool body 1 is smaller than the inner diameter of the bush 20 so that the tool body can make limited movements according to its constructional features.

The drill guide 5 can slide with respect to a flange 25 which has a slight clearance inside the second part 9, which allows an oscillation along a plane orthogonal to the tool axis. A set of springs 26 keep the flange 25 centered in the part 9.

The rear part of the tool (FIG. 3) is provided with connections 27 for both coolant and air directed to the cylinders 13, and with a sensor 28 connected to control devices of the machine which can stop the machine. The machine is on the right in FIG. 3.

Such a device is suitable for avoiding damage to the workpiece when the operator sets an incorrect drilling depth. In fact, in case of an excessive depth, when the stroke is over, the whole apparatus will draw back from the machine and actuates the sensor 28, stopping the machining operation.

The sequence is as follows:

First, set the drilling depth by adjusting the tool body 1 which is then installed inside the apparatus by inserting the spigot 4 into the bush 20.

Then set the air pressure in the cylinders 13 through the regulator 24 installed in the apparatus and check the value with the pressure gauge so as to get a greater thrust than the force exerted by the springs 18, but not excessive which could damage the workpiece to be machined.

Once installing the apparatus in the machine, place it on the hole trying to center it to the axis as much has possible. Now, the machine starts moving forward and inserts the drill guide 5 into the bush 6 in the jig 7. The force exerted by the springs 18 is sufficient for overcoming friction until bringing the drill guide into contact with the surface of the workpiece 100 to be machined.

In case of an improper positioning or alignment of the tool, its position adjusts itself automatically thanks to its floating possibility. In fact, in case of an improper alignment the drill guide driven by the bush 6 centers the tool with the hole axis through limited movements in contrast with the force exerted by the springs 23 and 26 that together form elastic means.

Both the spigot 4 and the flange 25 placed in the front part of the tool may carry out limited translation in a plane orthogonal to the tool axis, which allows the tool to lean slightly so balancing a possible misalignment.

When the drill guide reaches the surface of the workpiece to be machined, the continuous feed of the machine makes the drill start working.

During this phase, the second part 9 of the apparatus remains at a standstill while the first part 8 continues feeding. There is therefore a shifting between the two parts 8 and 9 in contrast to the force exerted by the piston rods 16.

The rotation is transmitted from the coupling body 12 to the bush 20 through the tooth 22. The bush 20 rotates the spigot 4 of the tool body that makes the drill 2 rotate while the body 1 remains at a standstill.

If the correct position of the surface to be machined were always sure, a numerical control of the machine feed would be enough. Since the surface to be machined is not ever in contact with the jig, it will be necessary to use a machine capable of carrying out a stroke longer than the drilling depth—which is controlled by the tool body 1 only—without damaging the workpiece.

To this end, the stroke of the pistons 14 is longer be a few millimeters than the drilling depth or stroke S set in the tool assembly 1, 2, 3. Then the machine feeds until the drill guide reaches the surface to be machined and continues feeding for drilling and flaring the workpiece.

Now the tool stops while the part 8 continues feeding until the end of the stroke is reached.

In this phase, the feeding takes place in contrast with the force exerted by the air on the pistons 14, while the body 1 of the tool and the bush 20 shift together with respect to the first part 8.

Spring 18 will compress until ring nut 1a bottoms out against part 1c. Since flange 17 is then prevented from advancing, continued forward motion of body 12 will cause body 10 to slide on rod 16 against the bias of spring 15.

Thus, it is clear that the system described makes it possible to align the tool on the hole axis automatically as well as balancing any possible difference; moreover it is possible to check accurately the drilling depth even if the position of the surface to be drilled with respect to the tool drill, is not exactly known.

An expert in the field will be then able to design several modifications and changes which shall be deemed as falling within the scope of this invention.

I claim:

1. An apparatus for controlled depth and centered machining of a workpiece at a machining location lying on an axis, using a jig having at least one opening centered at the machining location, and for use with a machine which is movable to the jig, the apparatus comprising:
   a first part (8) adapted to be fixed to the machine for movement with the machine toward the jig;
   a coupling (12) mounted for rotation around the axis and to the first part, the coupling being adapted for connection to the machine and for rotation by the machine;
   a second part (9) slidably mounted to the first part, for movement parallel to the axis;
   drive means (13, 14, 16) connected between the first and second parts for causing the movement of the second part with respect to the first part, by a first stroke toward and away from the machining location;
   a drill guide (5) mounted to the second part and extending around the axis, for engagement with the workpiece at the machining location;
   a tool assembly body (1) fixed to the drill guide for axial movement with the drill guide along the axis;
   a drill (2) rotatably mounted to the tool assembly body;
   mounting means (1a, 1b, 1c,) in the tool assembly body for mounting the drill for axial movement by a second stroke to the tool assembly body, the second stroke being shorter than the first stroke;
   first elastic means (26) connected between the drill guide and the second part for allowing some transverse movement between the drill guide and the second part, perpendicular to the axis, for centering the drill on the machining location of the workpiece; and
   second elastic means (23) connectd between the drill and the coupling for allowing some transverse movement between the drill and the coupling, perpendicular to the axis, for centering the drill on the machining location of the workpiece.

2. An apparatus according to claim 1, including axial biasing means (18) connected between the drill guide and the second part for allowing axial movement between the drill guide and the second part under the force of the biasing means when the drill guide bears against the workpiece, the force of the biasing means being less than a force exerted by the drive means.

3. An apparatus according to claim 2, wherein the drive means comprises at least one cylinder (13) formed in the first part, a piston (14) mounted for movement in the cylinder and a piston rod (16) connected between the piston and the second part, and pneumatic means for applying a force to said piston which is greater than the force of said biasing means for overcoming the force of said biasing means and for drilling a hole in the workpiece at the machining location, but not so much greater than the biasing force to damage the workpiece at the machining location.

4. An apparatus according to claim 2, including a coupling projection (3) rotatably mounted to the tool assembly body and axially fixed to the drill, a sliding bush (20) mounted for axial movement to and for rotation with the coupling (12), said second elastic means including springs (23) connected between said coupling projection and said sliding bush for allowing relative movement between said projection and said bush transverse to said axis for centering the drill at the machining location, said sliding bush being rotatably mounted and axially fixed to the second part.

5. An apparatus according to claim 4, wherein said first elastic means includes a flange (25) fixed to said drill guide (5) and a plurality of springs (26) connected between said flange and said second part for acting in a transverse direction to the axis.

6. An apparatus according to claim 5, wherein said sliding bush is mounted in said coupling, said coupling being rotatably mounted in said first part, said tool assembly body being positioned in said sliding bush with clearance, said drive means comprising a plurality of cylinders defined in said first part and a piston slidably mounted parallel to the axis in each cylinder, said second part including a second flange (17) connected to the piston of each cylinder.

7. An apparatus according to claim 6, wherein the apparatus is adapted for use with a numerically controlled machine, the first mentioned flange (25) connected to said drill guide being mounted with some clearance transverse to the axis, in the second part.

* * * * *